United States Patent
Dreher et al.

(10) Patent No.: US 9,151,274 B2
(45) Date of Patent: Oct. 6, 2015

(54) WIND TURBINE AND METHOD FOR HEATING A COMPONENT IN A WIND TURBINE

(75) Inventors: Moritz Dreher, Hamburg (DE); Lars Scheibig, Hamburg (DE); Frederic Radou, Alveslohe (DE)

(73) Assignee: Nordex Energy GmbH, Hamburg (DE)

( * ) Notice: Subject to any disclaimer, the term of this patent is extended or adjusted under 35 U.S.C. 154(b) by 819 days.

(21) Appl. No.: 13/416,539

(22) Filed: Mar. 9, 2012

(65) Prior Publication Data
US 2012/0231405 A1    Sep. 13, 2012

(30) Foreign Application Priority Data
Mar. 11, 2011  (DE) .......................... 10 2011 013 674

(51) Int. Cl.
*F03D 11/02* (2006.01)

(52) U.S. Cl.
CPC ............. *F03D 11/02* (2013.01); *F05B 2260/20* (2013.01); *F05B 2270/303* (2013.01); *Y02E 10/722* (2013.01)

(58) Field of Classification Search
CPC ............................... F03D 11/02; Y02E 10/722
USPC ................. 290/55; 415/1, 13, 15, 17
See application file for complete search history.

(56) References Cited

U.S. PATENT DOCUMENTS

| | | | |
|---|---|---|---|
| 7,217,091 B2* | 5/2007 | LeMieux | 416/95 |
| 7,874,165 B2* | 1/2011 | Wobben | 62/3.4 |
| 2004/0178638 A1 | 9/2004 | Wobben | |
| 2009/0191060 A1* | 7/2009 | Bagepalli et al. | 416/174 |
| 2009/0200114 A1* | 8/2009 | Bagepalli et al. | 184/6.22 |
| 2010/0135793 A1 | 6/2010 | Krauss | |
| 2010/0253079 A1 | 10/2010 | Bolln et al. | |

* cited by examiner

*Primary Examiner* — Nathaniel Wiehe
*Assistant Examiner* — Woody A Lee, Jr.
(74) *Attorney, Agent, or Firm* — Ottesen P.A.

(57) ABSTRACT

A wind turbine has a nacelle wherein a component is equipped with a first temperature sensor for detecting a temperature of the component, a second temperature sensor for detecting an outside temperature inside or outside the nacelle, a heater associated with a component to heat the latter, and a heater controller. The detected temperature of the component and the detected outside temperature are provided as input signals to the heater controller which activates the heater for heating when the detected temperature of the component is below a predetermined switch-on value for the heater. The switch-on value for the heater is, in at least one predetermined temperature interval, dependent on the detected outside temperature. The switch-on value for a first outside temperature is greater than the switch-on value for a second outside temperature in the temperature interval when the second outside temperature is greater than the first outside temperature.

25 Claims, 2 Drawing Sheets

WIND TURBINE AND METHOD FOR HEATING A COMPONENT IN A WIND TURBINE

CROSS REFERENCE TO RELATED APPLICATION

This application claims priority of German patent application no. 10 2011 013 674.6, filed Mar. 11, 2011, the entire content of which is incorporated herein by reference.

FIELD OF THE INVENTION

The invention relates to a wind turbine and to a method for heating a component in a wind turbine.

The invention also relates to a wind turbine having a nacelle, in which there is at least one component provided with a device for detection of a temperature of the component. The invention likewise relates to a method for heating a component in a wind turbine.

BACKGROUND OF THE INVENTION

United States patent application publication 2010/0253079 discloses a wind turbine having a heating device. The heating device has a thermal switch, which monitors the temperature of at least one component of the wind turbine and is operated when a threshold temperature is reached. A monitoring unit is also provided, which interacts with the heating device such that the monitoring unit activates the heating device until the thermal switch acts, and thereupon transmits an enabling signal for running up the wind turbine to the control device. Thus, it is achieved that at least temperature-critical components of the wind turbine are preheated to an operating temperature before running up. Furthermore, this publication discloses to provide a reheating module, which operates the heating device further still after reaching the temperature threshold and emitting the enabling signal, in order to further increase the temperature or to stabilize the value of the temperature. The reheating module can be connected to an outside temperature sensor in order to carry out reheating in those situations in which this is worthwhile and necessary because of a particularly low outside temperature.

United States patent application publication 2010/0135793 A1 discloses a lubrication system for a wind turbine, in which a heating system is provided in order to control oil depending on predicted outside influences such as a predicted wind speed, a predicted outside temperature, a predicted air pressure and/or a predicted air density.

United States patent application publication 2009/0191060 A1 discloses a wind turbine which is provided with a gearbox and in which a pump conveys a circulating lubrication medium. A heating device is provided in order to heat the lubricant in a conveying line to a temperature which prevents damage to the pump.

United States patent application publication 2009/0200114 discloses a heat management system for a gearbox of a wind turbine, in which the suction line for the lubricant of the gearbox is surrounded by a heating device. Temperature sensors determine the oil temperature in the gearbox, in the suction line, in the pump and the ambient temperature. If the ambient temperature and the oil temperature fall below a predetermined value, the heating device is activated.

SUMMARY OF THE INVENTION

It is an object of the invention to provide a wind turbine and a method for heating a component of a wind turbine, in/by which even at low temperatures a secure operation of the wind turbine can be carried out, with means which are as simple as possible.

The object of the invention is achieved by a wind turbine which includes: a nacelle; at least one component mounted in the nacelle; a first temperature sensor for detecting a temperature of the component; a second temperature sensor for detecting a temperature outside of the nacelle; a heater associated with the component in order to heat the component; a heater controller operatively connected to the heater; the first and second temperature sensors being connected to the heater controller for applying first and second input quantities thereto so as to activate the heater when the detected temperature of the component lies below a predetermined switch-on value for the heater; the switch-on value for the heater depends in at least one predetermined temperature interval on the outside temperature detected by the second temperature sensor; and, within the at least one predetermined temperature interval, the switch-on value at a first value of the outside temperature is greater than the switch-on value at a second value of the outside temperature when the second value of the outside temperature is greater than the first value of the outside temperature.

The object is likewise achieved with the method of heating a component of a wind turbine.

The wind turbine according to the invention has a nacelle, in which at least one component is equipped with a first temperature sensor for detection of a temperature of the component. The component may be an electrical, hydraulic or mechanical part or an entire assembly of parts. Furthermore, the wind turbine according to the invention has a second temperature sensor, which detects an outside temperature inside or outside the nacelle. Furthermore, the wind turbine according to the invention has a heating means which is associated with the at least one component in order to heat the latter. Furthermore, a heater controller is provided, to which the detected temperature of the component and the outside temperature are provided as input signals and which activates the heating means for heating when the detected temperature of the component is below a switch-on value for the heating means. According to the invention, the switch-on value for the heating means is in at least one predetermined temperature interval depending on the outside temperature. The dependency of the switch-on value on the detected outside temperature is in this case such that the switch-on value for a first outside temperature is greater than the switch-on value for a second outside temperature, when the second outside temperature is greater than the first outside temperature.

A switch-on value determined in this manner for the heating means results in greater switch-on values being provided for the heating means when the outside temperature decreases. The invention is based on the insight that, particularly when the outside temperature is low, great temperature differences can occur within the wind turbine, which are harmful for continued operation or when operation is to be restarted. Usually, monitoring of a temperature-critical component is based on only an operating temperature in a specific area of the component. In doing so the situation can occur that areas of this component which are more distant from the measurement point or adjacent components cool down too much notwithstanding the provision of a heater. In contrast to this, in the wind turbine according to the invention, at a low outside temperature, the heater for the component to be monitored is switched on at a greater temperature of the component than it would be in the case of a greater outside temperature. This makes it possible to prevent severe cooling down of adjacent and distant areas of the component.

In one preferred embodiment of the wind turbine according to the invention, the heater controller is configured such that, within the predetermined temperature interval, each switch-on value for a first outside temperature is greater than every other switch-on value for a second outside temperature when the second outside temperature is greater than the first outside temperature. In other words, within the predetermined temperature interval, there is a strictly monotonic characteristic of the switch-on value depending on the outside temperature.

In one preferred improvement of the wind turbine according to the invention, the heater controller switches off the heating means when the value of the detected temperature of the component is above a predetermined switch-off value for the heating means, wherein the switch-off value is always greater than the switch-on value for the respective outside temperature. When the component is heated by the heating means at a given outside temperature, the heating means is operated until the temperature of the component to be monitored has reached the switch-off value. Accompanied with this is that the switch-off value for the heating means is greater than the switch-on value for the heating means. The heater controller in this embodiment is realized as an on-off controller, which regulates the temperature of the component to values between the switch-on value and the switch-off value.

In one preferred improvement, the switch-off value is greater than the switch-on value by a constant temperature difference for every outside temperature in the temperature interval. Preferably, the temperature difference has a value between 2 K and 15 K. This means that the heater controller according to the invention determines the switch-on value depending on the outside temperature and that the switch-off value is greater than the correspondingly determined switch-on value by a constant temperature difference. From the point of view of control engineering, a heater controller such as this can be configured particularly simply.

In one preferred embodiment, a transmission is provided as the temperature-critical component to be monitored of a wind turbine. Expediently, the temperature sensor for the component detects the temperature of a lubricant in the transmission. For this purpose, the temperature sensor can, for example, be arranged in an oil sump or on a pan for the oil sump. Since, in the case of the wind turbine according to the invention, the switch-on value for the heating means rises as the outside temperatures decreases, it is sufficient to provide just one temperature sensor for the component.

In one preferred embodiment the interval for the outside temperature extends down to temperatures of −30° C., preferably down to −50° C. The upper value of the temperature interval can be chosen as appropriate, depending on the location and/or design of the wind turbine. A temperature interval which extends down to −40° C. is suitable for locations where the outside temperature is particularly low.

In one preferred embodiment of the wind turbine according to the invention, the switch-on temperature has a maximum value which extends up to 30° C., preferably up to 50° C. A maximum switch-on value of 40° C. is also suitable. The maximum switch-on value is the switch-on value which occurs at the lowest outside temperature of the temperature interval.

As noted above, the object according to the invention is likewise achieved by a method of the invention.

The method according to the invention is provided and intended for heating a component in a wind turbine. The method according to the invention is carried out with the following steps: detecting an outside temperature and a temperature of the component to be heated of the wind turbine. In addition, the step of determining a switch-on value for a heater of the component depending on the detected outside temperature is provided. With the method according to the invention, the switch-on value is determined such that the switch-on value for a first outside temperature is greater than for a second outside temperature when the second outside temperature is greater than the first outside temperature. Finally, the method according to the invention also comprises the step of switching on the heater when the detected temperature of the component is below the switch-on temperature.

The method according to the invention ensures that a greater switch-on value for the heating means is provided when the outside temperature is low. The method according to the invention furthermore ensures that at a low outside temperature the wind turbine switches on the heater for the component to be monitored at a greater temperature of the component than it would be in the case of a greater outside temperature. In the method according to the invention, the switch-on value of the heating means is preferably determined such that in a predetermined temperature interval the switch-on temperature decreases as the outside temperature rises.

In one preferred improvement of the method according to the invention, a switch-off value for the heating means is determined. The switch-off value is greater than the switch-on value for each detected outside temperature. There is therefore a switch-off value for each outside temperature which is greater than the corresponding switch-on value for this outside temperature. In this improvement, the method according to the invention provides a switch-off of the heating means when the detected temperature of the component is above the switch-off value. Thus, an on-off control is carried out between the switch-on value and the switch-off value for the heating means.

One advantageous improvement of the method implies that the switch-off value is greater than the switch-on value by a constant temperature difference. The switch-off value therefore obeys the graph of the switch-on value in the temperature interval, in its dependency on the outside temperature.

In one preferred embodiment of the method according to the invention, it is envisaged to detect the temperature of the lubricant in a transmission of the wind turbine. The transmission is a temperature-critical component of the wind turbine, for which it is necessary to ensure that the lubricant has a suitable temperature. Furthermore, the method according to the invention ensures that, when only one temperature sensor is used for monitoring, the areas of the transmission which are more distant from the measurement point do not cool down too much. Large temperature differences give rise to an increased mechanical load on the transmission.

In one advantageous embodiment, the switch-on value is determined in dependency on a detected outside temperature within a predetermined temperature interval.

The interval of the outside temperature extends down to temperatures of −30° C., preferably down to −50° C.

It can be envisaged for the switch-on value of the heating means to extend to the maximum of up to 30° C., preferably up to 50° C. In different designs of the wind turbine, the interval of the outside temperature can extend down to −40° C. and the switch-on value can extend up to +40° C. In doing so the maximum value of the possible switch-on value is attributed to the lowest temperature value of the interval of the outside temperature.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
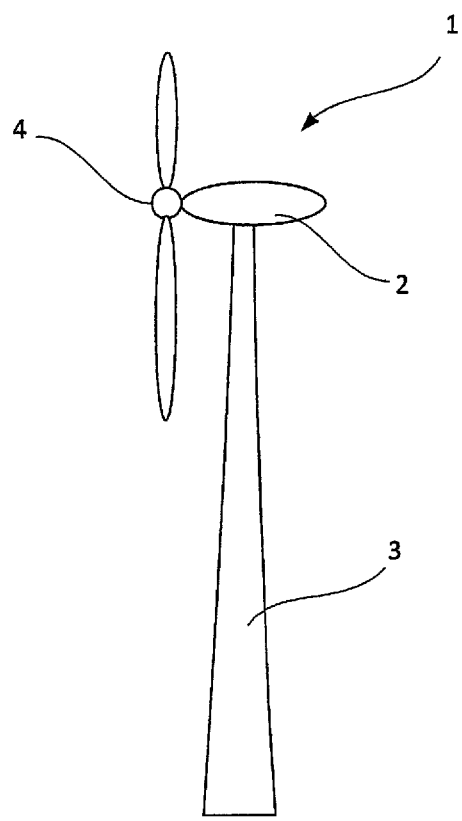
FIG. 1 shows a schematic of a wind turbine.

FIG. 1 shows a wind turbine 1 according to the invention having a nacelle 2, a rotor 4 and a tower 3.

Figure 2:
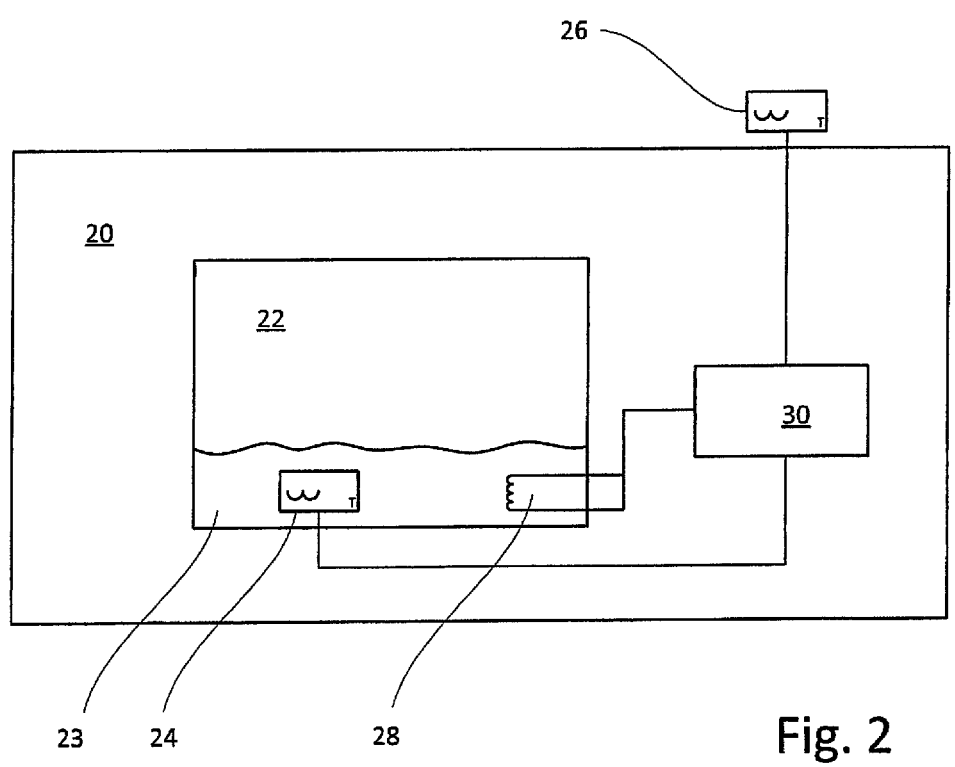
FIG. 2 shows a schematic of a nacelle with a transmission and a heating means.

FIG. 2 is a schematic of the nacelle 20. A transmission 22 with an oil sump 23 is arranged in the nacelle 20. The oil located therein can be heated by a heating means 28. The temperature of the oil sump is detected by the temperature sensor 24. An external temperature sensor 26 for determining the outside temperature is located on the nacelle 20. Furthermore, a heater controller 30 is provided in the nacelle 20 and interacts with the heating means 28. The detected values for the temperature of the oil sump and for the outside temperature are provided as input signals to the heater controller. The heater controller regulates the operation of the heating means according to a characteristic curve which is illustrated in FIG. 3 and FIG. 4.

Figure 3:
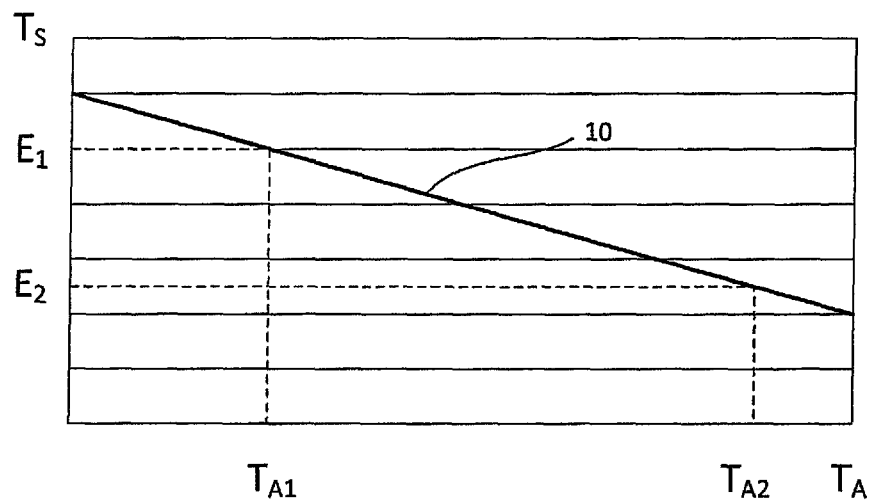
FIG. 3 shows a switch-on threshold value depending on the outside temperature, for the heater of the oil sump heating in a transmission; and, FIG. 4 shows on-off control depending on temperature for the activation or deactivation of the heating means.

FIG. 3 shows a characteristic curve 10 which illustrates a switch-on value of an electrical oil sump heater in a transmission in a wind turbine according to the invention. The characteristic curve 10 is plotted as an oil sump temperature $T_S$ as a function of the outside temperature $T_A$. The characteristic curve should be understood as follows: a switch-on value $E_1$ for the oil sump heater is given at an outside temperature $T_{A1}$. This means that the oil sump heater is switched on when the temperature in the monitored oil sump is below $E_1$. A second switch-on value $E_2$ is given by the characteristic curve 10 at a second value of the outside temperature $T_{A2}$, by falling below this value $E_2$ the oil sump heater is switched on. The characteristic curve 10 is characterized in that the value $E_1$ for a lower outside temperature $T_{A1}$ is greater than the value $E_2$ for a higher outside temperature $T_{A2}$. The oil sump heater of a wind turbine, which is exposed to a low outside temperature for example in the region of $T_{A1}$, is therefore switched on at considerably greater oil sump temperatures. Even if the switch-on value is considerably above the temperature value required for the operation of the transmission, the greater switch-on value $E_1$ ensures that the transmission does not cool down too much, in particular in its outer areas and hence a too great temperature gradient occurs in the transmission.

Figure 4:
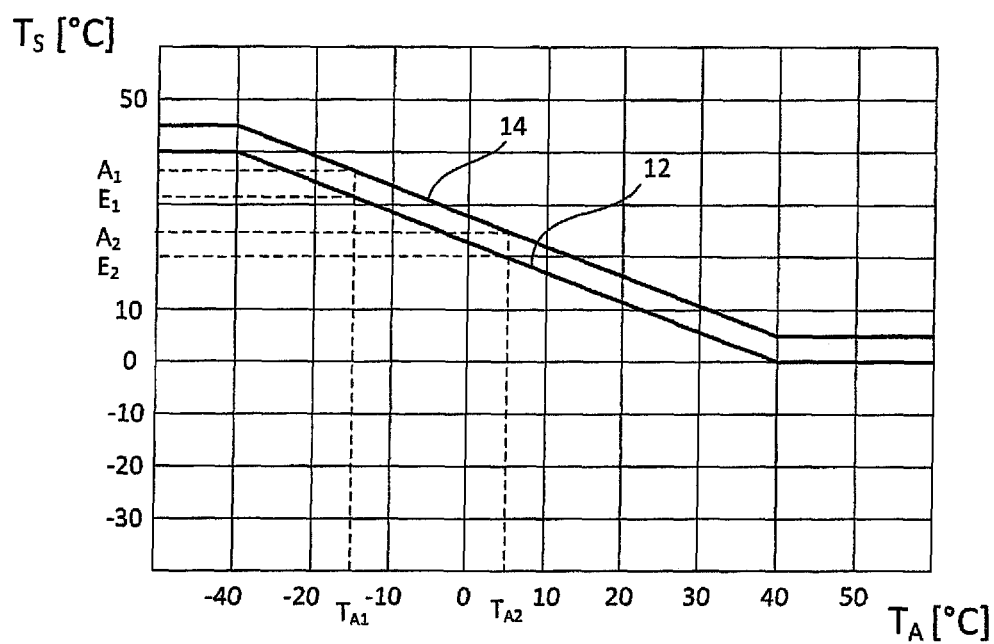

FIG. 4 shows an improvement of the characteristic curve 10 described with respect to FIG. 3. FIG. 4 shows a characteristic curve 12 for the switch-on values and a characteristic curve 14 for the switch-off values for the oil sump heater, as a function of the outside temperature $T_A$. The illustration of the characteristic curves 12 and 14 should be understood such that a switch-on value $E_1$ of the characteristic curve 12 and a switch-off value $A_1$ of the characteristic line 14 are given for an outside temperature $T_{A1}$. Therefore, if the temperature of the oil sump decreases to a temperature below the value $E_1$ at a temperature $T_{A1}$, a heating-up of the oil sump is carried out. When the oil sump temperature rises, the heating process is continued, even if the switch-on value $E_1$ is exceeded. The heating is switched off at a temperature value $A_1$, which, in the present example, is approximately 5° C. greater than the switch-on value.

The values $E_2$ and $A_2$ for the temperature $T_{A2}$ should be understood in a corresponding manner.

The characteristic curves illustrated in FIG. 4 are provided with units by way of example. Thereby can be determined, that for example the oil sump is heated up to 40° C. when the outside temperature $T_A$ is −30° C. This means that the oil sump is heated to a considerably greater temperature than that required for the operation of the transmission. The temperature ensures that the transmission, which is exposed to the temperature of −30° C. at its outer area, does not cool down and generate too great temperature gradients, which are disadvantageous for operation of the wind turbine. In contrast, the oil sump of the transmission is heated only to a temperature of 25° C. when the outside temperature is 5° C.

It is understood that the foregoing description is that of the preferred embodiments of the invention and that various changes and modifications may be made thereto without departing from the spirit and scope of the invention as defined in the appended claims.

REFERENCE SIGNS

1 Wind turbine
2 Nacelle
3 Tower
4 Rotor
10 Characteristic curve
12 Characteristic curve
14 Characteristic curve
20 Nacelle
22 Transmission
23 Oil sump
24 Temperature sensor
26 External temperature sensor
28 Heating means
30 Heater controller

What is claimed is:

1. A wind turbine comprising:
a nacelle;
at least one component mounted in said nacelle;
a first temperature sensor for detecting a temperature of said component;
a second temperature sensor for detecting a temperature outside of said nacelle;
a heater associated with said component in order to heat said component;
a heater controller operatively connected to said heater;
said first and second temperature sensors being connected to said heater controller for applying first and second input quantities thereto so as to activate said heater when the detected temperature of said component lies below a predetermined switch-on value for said heater;
said switch-on value for said heater is, in at least one predetermined temperature interval, a function of the outside temperature detected by said second temperature sensor; and,
within said at least one predetermined temperature interval, said switch-on value at a first value of said outside temperature is greater than said switch-on value at a second value of said outside temperature when said second value of said outside temperature is greater than said first value of said outside temperature.

2. The wind turbine of claim 1, wherein said second temperature sensor is located inside said nacelle.

3. The wind turbine of claim 1, wherein said second temperature sensor is located outside said nacelle.

4. The wind turbine of claim 1, wherein, within said predetermined temperature interval, each first switch-on value at a first value of said outside temperature is greater than each switch-on value at a second value of said outside temperature when said second value of said outside temperature is greater than said first value of said outside temperature.

5. The wind turbine of claim 1, wherein said heater controller is configured to switch off said heater when the detected temperature of said component lies above a predetermined switch-off value for said heater; and, said switch-off value is always greater than the switch-on value at the detected outside temperature corresponding thereto.

6. The wind turbine of claim 1, wherein said component of the wind turbine is a transmission.

7. The wind turbine of claim 6, wherein said first temperature sensor for the temperature of said component detects the temperature of a lubricant in said transmission.

8. The wind turbine of claim 1, wherein precisely one temperature sensor is provided for said component.

9. The wind turbine of claim 1, wherein said interval for the outside temperature extends down to −30° C.

10. The wind turbine of claim 1, wherein said interval for the outside temperature extends down to −50° C.

11. The wind turbine of claim 1, wherein the switch-on value of the temperature for said heater is at most 30° C.

12. The wind turbine of claim 1, wherein the switch-on value of the temperature for said heater is at most 50° C.

13. A wind turbine comprising:
a nacelle;
at least one component mounted in said nacelle;
a first temperature sensor for detecting a temperature of said component;
a second temperature sensor for detecting a temperature outside of said nacelle;
a heater associated with said component in order to heat said component;
a heater controller operatively connected to said heater;
said first and second temperature sensors being connected to said heater controller for applying first and second input quantities thereto so as to activate said heater when the detected temperature of said component lies below a predetermined switch-on value for said heater;
said switch-on value for said heater depends in at least one predetermined temperature interval on the outside temperature detected by said second temperature sensor; and,
within said at least one predetermined temperature interval, said switch-on value at a first value of said outside temperature is greater than said switch-on value at a second value of said outside temperature when said second value of said outside temperature is greater than said first value of said outside temperature;
said heater controller being configured to switch off said heater when the detected temperature of said component lies above a predetermined switch-off value for said heater;
said switch-off value always being greater than the switch-on value at the detected outside temperature corresponding thereto; and,
the switch-off value being greater than the switch-on value by a constant temperature difference for every outside temperature in said temperature interval.

14. The wind turbine of claim 13, wherein the temperature difference is selected to be in the interval from 2 K to 15 K.

15. A method for heating a component in a wind turbine, the method comprising the steps of:
detecting a temperature of the component of the wind turbine;
detecting an outside temperature;
determining a switch-on value for a heater of said component depending on the detected outside temperature wherein the switch-on value for a first outside temperature is greater than the switch-on value for a second outside temperature when the second outside temperature is greater than the first outside temperature; and,
switching on the heater when the detected temperature of the component is below a switch-on value.

16. The method of claim 15, wherein the switch-on value of the heater is determined such that this switch-on value decreases in a predetermined temperature interval as the outside temperature rises.

17. The method of claim 15, comprising the further steps of:
determining a switch-off value for the heater such that the switch-off value is greater than the switch-on value for the detected outside temperature; and,
switching off the heater when the detected temperature of the component is above the switch-off value.

18. The method of claim 15, wherein the detected temperature of the component is the temperature of a lubricant of a transmission of the wind turbine.

19. The method of claim 15, wherein the step of determining the switch-on value depending on the outside temperature is carried out within a predetermined temperature interval.

20. The method of claim 19, wherein the interval of the outside temperature extends down to −30° C.

21. The method of claim 19, wherein the interval of the outside temperature extends down to −50° C.

22. The method of claim 15, wherein the switch-on value extends up to 30° C.

23. The method of claim 15, wherein the switch-on value extends up to 50° C.

24. A method for heating a component in a wind turbine, the method comprising the steps of:
detecting a temperature of the component of the wind turbine;
detecting an outside temperature;
determining a switch-on value for a heater of said component depending on the detected outside temperature wherein the switch-on value for a first outside temperature is greater than the switch-on value for a second outside temperature when the second outside temperature is greater than the first outside temperature;
switching on the heater when the detected temperature of the component is below a switch-on value;
determining a switch-off value for the heater such that the switch-off value is greater than the switch-on value for the detected outside temperature by a constant temperature difference; and,
switching off the heater when the detected temperature of the component is above the switch-off value.

25. The method of claim 24, wherein the temperature difference has a value between 2 K and 15 K.

* * * * *